United States Patent

Caton

[11] 4,005,927
[45] Feb. 1, 1977

[54] BROAD BANDWIDTH OPTICAL MODULATOR AND SWITCH

[75] Inventor: William M. Caton, El Cajon, Calif.

[73] Assignee: The United States of America as represented by the Secretary of the Navy, Washington, D.C.

[22] Filed: Mar. 10, 1975

[21] Appl. No.: 557,216

[52] U.S. Cl. .................. 350/96 WG; 350/96 C; 350/160 R
[51] Int. Cl.² .......................................... G02B 5/14
[58] Field of Search ....... 350/96 WG, 96 R, 160 R, 350/96 C

[56] References Cited

UNITED STATES PATENTS

| | | | |
|---|---|---|---|
| 3,695,745 | 10/1972 | Furukawa | 350/160 R |
| 3,795,433 | 3/1974 | Channin | 350/96 C |
| 3,874,782 | 4/1975 | Schmidt | 350/96 WG |
| 3,877,781 | 4/1975 | Kaminow | 350/96 WG |
| 3,883,220 | 5/1975 | Taylor | 350/96 WG |
| 3,887,885 | 6/1975 | Hattori | 350/96 WG |
| 3,923,374 | 12/1975 | Martin | 350/96 WG |

Primary Examiner—John K. Corbin
Assistant Examiner—Stewart Levy
Attorney, Agent, or Firm—R. S. Sciascia; G. J. Rubens; J. W. McLaren

[57] ABSTRACT

A modulator and switch for optical energy includes an optical waveguide defining a path for the propagation of optical energy, a source of microwave energy, and at least one strip transmission line disposed in co-directional proximity relative to the optical waveguide and connected to the source of microwave energy. The strip transmission line is designed to have dimensions and dielectric constants for producing a propagation velocity of the microwave energy substantially equal to the propagation velocity of the optical energy in the optical waveguide. A suitable microwave load is connected to the transmission line for completing an electrical circuit with the source of microwave energy.

7 Claims, 3 Drawing Figures

BROAD BANDWIDTH OPTICAL MODULATOR AND SWITCH

BACKGROUND OF THE INVENTION

Optical waveguide modulators and switches which have been operative objectives comparable to those of the present invention have been previously described in several U.S. patents including U.S. Pat. No. 3,408,131 for an "Apparatus for Coupling and Amplifying Light Between Optical Fibers," issued to Narinder S. Kapany, Oct. 29, 1968, and U.S. Pat. No. 3,589,794 for "Optical Circuits," issued to Enrique A. J. Marcatili, issued June 29, 1971. This type of prior art developments were, however, characterized by an electrical drive signal applied in phase along the length of the optical waveguide or alternatively so as to form a standing wave along the length of the optical waveguide. Moreover, the electrodes that were employed in this prior art type of system did not form an electrical transmission line. Accordingly, the length of such structures was limited in efficient bandwidth embodiments to a fraction of the electrical drive signal wavelength involved, as principally determined by the properties of the device material and the maximum frequency of the electrical drive signal.

In other types of prior art the limitation on the length of the modulator was overcome by travelling wave modulators of the type described by W. W. Rigrod and I. P. Kaminow in an article entitled "Wideband Microwave Light Modulation," published in the Proceedings of the IEEE, 1963.

In this type of prior art the phase velocities of the electrical and the optical energies were matched along one axial direction of propagation. However, the light propagated in an unbounded media or through a sequence of lenses in the plane transverse to the direction of propagation and the electrical energy occupied a region whose dimensions were several orders of magnitude larger than the wavelength of the light energy.

The electrical energy was guided co-linearly with the optical energy by a metallic walled waveguide or by two metallic surfaces which serve to reflect the microwave energy back and forth across the beam of light. In the dimensions transverse to the direction of propagation of the light the electrical energy was confined to a region whose linear dimensions were of the order of one wavelength of the electrical energy involved.

The magnitude of the change in the optical wavelength induced by the electrical energy was proportional to the magnitude of the electrical field strength of the electrical energy throughout the region in which the magnitude of the optical energy is significant. The electrical power required to induce a given optical wavelength change was proportional to the product of the electrical field strength and the transverse dimension over which the electrical field strength is significant.

There is, therefore, a need for a modulator which inherently requires lateral dimensions much smaller than comparable dimensions in prior art devices so as to afford a correlated reduction in the electrical power required for the operation of the modulator in a practical device. In addition it is highly desirable that the electrical and optical energies be confined by structures that enable the electrical and optical energies to propagate co-linearly at substantially the same phase velocity in order that broad bandwidth operation to be readily attainable.

Accordingly, there is a need for an optical waveguide modulator and switch in which the length of the device is not limited in the manner that was characteristic of functionally comparable prior art devices. Moreover, it is highly desirable that in addition to the efficient broad bandwidth operation, the optical waveguide modulator and switch require a minimum magnitude of electrical drive signal for an acceptable and efficient level of operation.

SUMMARY OF THE INVENTION

The concept of the present invention is such that the length of the optical waveguide modulator switch fabricated in accordance with its teachings is not limited in the manner of the previously described prior art devices. Consequently, the optical waveguide modulator and switch of the present invention can be made longer in length as may be desired to produce a corresponding decrease in the magnitude of the electrical drive signal required, thus providing a much greater electrical drive signal bandwidth.

The concept of the present invention provides a significantly enhanced device in that it conceives the confinement of the light to the small region of an optical waveguide thereby reducing the magnitude of the electrical drive signal which is employed to provide a strong electric or magnetic field in the operation of the device. As a consequence, the drive signal voltage or current can be correspondingly reduced leading to much more efficient operation. Co-linear propagation of the light energy and of the electrical drive signal, each along its own waveguide structure, is determined and achieved by a proper selection of the dimensions and the dielectric constants of the materials comprising the two waveguiding structures. These parameters are so determined and chosen that the velocity of propagation of the light energy and that of the electrical drive signal are nearly or substantially equal. The interaction between the electrical drive signal and the propagating light is a travelling wave interaction. The electrical drive signal is impressed upon one end of its guiding structure and arranged to be completely absorbed at the other end of an appropriate electrical load means such that substantially no reflected wave is sustained.

In accordance with the concept of the present invention, the light energy is confined to a smaller region by its waveguiding structure than is the electrical drive signal by its co-extensive waveguiding structure. By suitable choices of dimensions and materials, the characteristics of the region interacting strongly only with the electrical drive signal may be chosen to match the velocity of the propagation of the electrical drive signal to the velocity of propagation of the light energy.

In one embodiment of the present invention the optical waveguide may comprise a diffused channel waveguide fabricated in a suitable II–VI compound substrate. Two strip metal electrodes may be co-extensively deposited on the surface of the same substrate co-directionally and co-linear with the diffused general waveguide. Such strip metal electrodes form a strip transmission line upon being energized by a suitable source of microwave signals. By adjusting the width and the separation of the strip transmission lines and by the choice of the dielectric constant of the region above the substrate, the velocity of propagation of light energy along the diffused channel optical waveguide in the II–VI compounds is a function of the color or wavelength of the light energy. The velocity propagation of the electrical drive signal along the strip transmission line and that of the light energy can be controlled so as to be substantially equal for one specific color or wavelength of light.

In an alternative embodiment of the present invention, a suitable II–VI compound substrate, such as germanium or galium arsenide, supports a diffused optical waveguide in the form of a thin layer expitaxially grown on the substrate. A deposited metal electrode overlays the substrate in a substantially congruent fashion and with a suitable insulating layer therebetween such as silicon dioxide forms the waveguide for the modulating electrical signal. The electrically insulating layer serves to isolate the fields associated with the propagation of the light energy from the metal electrode and thus maintain a low loss structure for the light energy.

Though the previously described embodiments of the present invention are inherently phase modulators, they can, however, be implemented as amplitude modulators by utilizing appropriately chosen external light polarizers in combination with the embodiments described.

The concept and teaching of the present invention may be embodied in an optical switch as contrasted to an optical modulator by the fabrication of two co-extensive and preferably parallel channel optical waveguides diffused into a common substrate with a small separation therebetween. A conductive electrode between the two channel optical waveguides together with second and third conductive electrodes on either side of the two channel optical waveguides, form a strip transmission line for the switching of the signal. The center strip transmission line between the two channel optical waveguides is connected in common to two sources of appropriate electrical signals of opposite polarization while the other strip transmission lines are connected to the other sides of the two sources of electrical signals.

Suitable electrical loads are connected to the other ends of the strip transmission lines so that the center strip transmission line is connected to a common point between the electrical loads. The material which comprises the region external to the substrate in which the optical waveguide is fabricated is chosen so as to adjust the propagation velocity of the electrical switching signal to be substantially equal to that of the light energy propagating along the two co-directional, co-linear, and co-extensive channel optical waveguides.

Thus, it may be seen and appreciated that the concept of the present invention provides superior characteristics of operation in that it inherently requires the confinement of light energy to the relatively small region of the optical waveguide reducing the magnitude of the electrical drive signal which is required to supply a sufficiently strong electric or magnetic field to give effect to the modulation and switching functions thus providing a significantly more efficient device. Moreover, the lengths of the structures fabricated in accordance with the teachings and concept of the present invention are not limited in the manner that many functionally comparable prior art devices are limited with the result that a broader range of devices of varying lengths is afforded which operate with increased efficiency over a much greater drive signal bandwidth.

Accordingly, it is a primary object of the present invention to provide an improved optical waveguide modulator and switch of enhanced efficiency of operation.

A concomitant primary object of the present invention is to provide such an optical waveguide modulator and switch which is capable of providing a much greater electrical drive signal bandwidth than prior art comparably functional devices.

Yet another most important object of the present invention is to provide such an optical waveguide modulator and switch which is capable of both phase and amplitude modulation in variant embodiments.

A further object of the present invention is to provide such an optional waveguide modulator and switch which is readily adaptable to fabrication with presently available materials and fabrication techniques.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
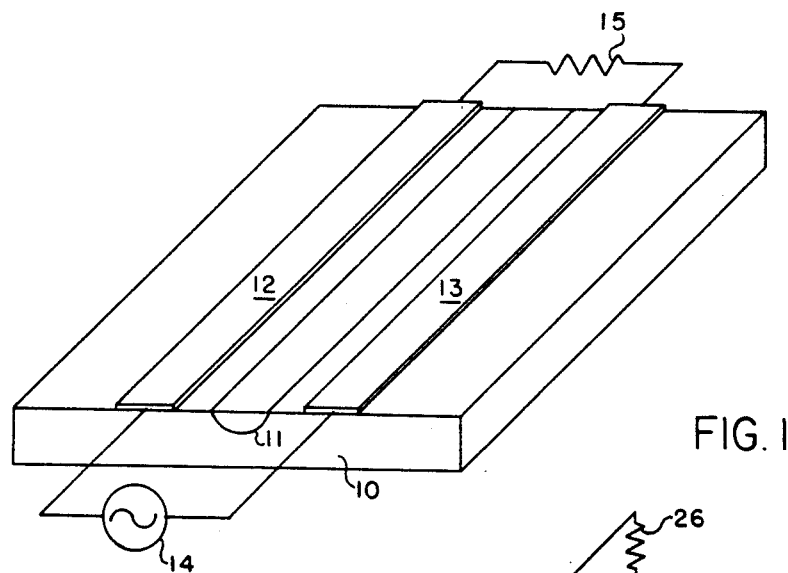
FIG. 1 is a greatly enlarged representation of an embodiment of the present invention.

One of the most significant differences between the concept and teaching of the present invention, as contrasted with those of the known prior art, relates to the manner in which the radio frequency or microwave electrical signals interact with the signals of the optical energy.

In many of the optical waveguide modulator switches described in the prior art there was an interaction with a radio frequency or microwave standing wave. Bulk optical modulators have been described in the prior art in which the optical energy and the electrical energy in the form of microwave or radio frequency signal propagate co-linearly. Typical of such modulators is the disclosure in a scientific article titled "Propagation Characteristics of Partially Loaded Two Conductor Transmission Line for Broadband Light Modulators," published by I. P. Kaminow and V. Liu in the Proceedings of the IEEE, January 1963. In this type of devices the microwave energy propagates along a transmission line or electrical waveguide, but the optical energy does not propagate in a comparable manner.

The relationship required between propagation velocity of the optical energy along an optical waveguide $\beta_O$ and the microwave energy along a microwave waveguide $\beta_m$ is identical to the case where the optical energy is not confined to a waveguide but is free space propagation. For a maximum depth of modulation for a device of any length, $\beta_O$ should equal $\beta_m$. In practical devices these parameters may never be exactly equal.

The magnitude of the reduction in the depth of modulation is dependent upon the length of the device. The relationship of the difference between $\beta_O$ and $\beta_m$, the length of the device, and the decrease in modulation depth is independent of whether the optical energy is confined to an optical waveguide or propagates essentially as in free space, or is propagated in a zigzag path through the structure.

The latter two cases have been discussed in the scientific literature as, for example, in the article titled "Wide Band Microwave Light Modulation," by W. W. Rigrod and I. P. Kaminow in Proceedings of the IEEE in January 1963. A number of patents have been issued describing various such prior art structures and techniques which may be used to produce devices in which the optical and the microwave propagation velocities are closely equal. The concept and teaching of the present invention, inherently require that $\beta_o$ and $\beta_m$ be controlled and made closely equal, but by different means and techniques.

The propagation velocity of both the optical and the microwave energy is a strong function of the particular waveguide in which they propagate. The problem therefore is to devise co-linear optical microwave waveguides with $\beta_o$ closely equal to $\beta_m$ and such that both the optical and the microwave energy are concentrated in essentially the same region.

The propagation velocity $\beta_o$ lies between the free space propagation velocities of media of the same refractive index as the substrate $k_s$ and have the same refractive index as the maximum refractive index of the optical waveguide $k_m$. Typically $(k_m - k_s)/k_s$ is of the order of 0.0001 to 0.001 to ensure that only one optical mode propagates in the optical waveguide. The exact value of this ratio is dependent upon waveguide geometry principally in terms of width and depth. $\beta_O$ is then only slightly different from $k_s$, and $k_s$ can be varied over wide limits by varying the substrate material in terms of its composition.

Accordingly, as shown in the embodiment of FIG. 1 the composition of the substrate 10 may be an appropriate material such as $Zn\ Se_{1-x}\ Te_x$ in which case the refractive index of the substrate at a wavelength of 8,000A or $0.8\mu$ varies from 2.51 to 2.85 as $x$ varies from 0 to 1. $k_s$ then varies from $(1/2.51)\ C = 0.398C$ meters/second to $1/2.85C = 0.35C$ meters/second as $x$ varies from 0 to 1 and where $C$ is the vacuum, free space velocity of light. The optical waveguide 11 in the illustration in the embodiment of FIG. 1 may therefore be fabricated in the substrate material 10 by an appropriate Cd diffusion and the use of known techniques.

Since Zn, Cd, Te, Se, and S are completely miscible, any combination of these elements, for example may be employed in fabricating an embodiment of the present invention.

A strip transmission line 12 and 13 may be fabricated by the deposition of an appropriate electrically conductive material on the substrate 10. The strip transmission lines 12 and 13 are disposed in co-directional proximity relative to the optical waveguide 11 and their propagation velocity $\beta_m$ is a function of their dimensions, principally their width, and of the microwave dielectric constant of the substrate material 10.

The publication of Bryant and Weiss titled "Parameters of Micro Strip Transmission Lines," appearing in IEEE-MTT 16 at page 1021 may be considered typical of the results to be expected of the operative characteristics of the waveguides described by G. P. Wen, which appeared at IEEE Transactions on "Microwave Theory and Techniques," Vol. MTT-17, No. 12, pp 1087–1090. From these data if $W/H = 2.5$ for $k = 9.0$ then $\beta_m = 1.19$ m/sec $= (1.19/2.99) \times C = 0.98C$ which equals $\beta_o$ if $x = 0$. Thus by adjusting the width and separation of the strip transmission line and by the choice of a dielectric constant of the region above the substrate, the velocity propagation of light of a suitable substrate such as II–VI compounds is a function of the color or wavelength of the light energy. The velocity of propagation of the electrical drive signal impressed upon the strip transmission lines 12 and 13 can be controlled to be substantially equal to the velocity of propagation of the light energy for one specific color or wavelength of light.

Figure 2:
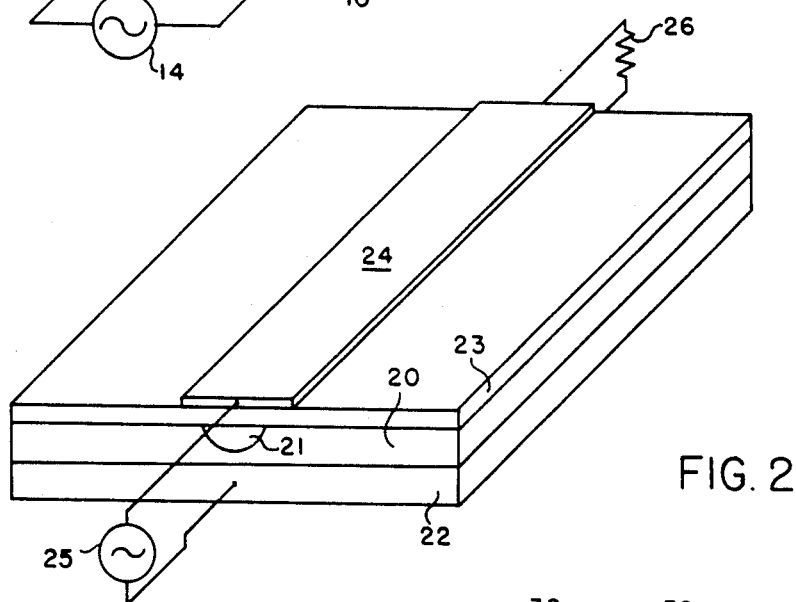
FIG. 2 is a greatly enlarged representation of a variant embodiment of the present invention.

FIG. 2 illustrates an alternative embodiment of the present invention in which a suitable II–VI compound is employed as the substrate 20 and supports a diffused optical waveguide in the region 21. In the embodiment of FIG. 2 the substrate material 20 is in a thin layer epitaxially grown on a suitable supporting material 22 such as germanium or galium arsenide, for example.

An electrically insulating layer 23 is deposited on top of the substrate material 20 and thereafter an electrically conductive material 24 is deposited on top of the electrically insulating material 23 to form a strip transmission line in co-directional proximity relative to the optical waveguide 21.

A source of electrical drive signal 25 is connected to the strip transmission line 24 and the supporting material 22 in circuit with an appropriate electrical load means 26 to complete an electrical circuit. The electrically insulating layer 23 of a suitable material such as silicon dioxide, for example, serves to isolate the fields associated with the light energy from the strip transmission line 24 and thus maintain a desirably low loss structure for the propagation of the light energy.

In operation one end of the strip transmission lines 12 and 13 as illustrated in FIG. 1 are excited by the microwave signal source 14. The electrical microwave signal propagates along the strip transmission lines 12 and 13 with a phase velocity $v_e$ and is wholly absorbed in the load 15 at the far end of the electrical transmission line.

Simultaneously, light energy is launched into the channel optical waveguide 11 at the same end of the modulator as the input to the strip transmission lines included in the electrical transmission line circuit previously described. The light propagates along the optical waveguide 11 and emits at the far end.

The microwave electrical energy interacts with the optical light energy by means of an electro-optic effect. The electric field of the microwave electrical signal increases the optical phase velocity of the substrate 10 in which the optical waveguide has been fabricated as previously described. When the propagation velocities of the microwave electrical energy and the optical light energy are substantially equal, light energy traversing the modulator propagates through a medium in which phase velocity is always that determined by the microwave electrical energies injected into the electrical strip transmission lines at the same instant as the light energy.

Light energy entering the modulator an instant later propagates through a media whose phase velocity is determined by the electrical microwave signal energy which is impressed upon the strip transmission lines at a simultaneously later instant. The phase of the optical energy at the exit point of the modulator will be equal to the integral of the phase velocity of the media over the length of the modulator. In the operation of the modulator of the present invention as described hereinabove the excess phase velocity beyond that existing when no electrical microwave signal is applied is proportional to the product of the magnitude of the applied electrical microwave signal and the length of the modulator.

For successful operation of the modulator of the present invention the propagation velocities of the electrical and light energies must be substantially matched.

In the practice of the present invention, fabrication of its embodiment should include the following essential steps:

1. The selection of a microwave strip transmission line of an appropriate electrically conductive material and the determination of the propagation velocity of the electrical microwave signal along the strip transmission line structure.
2. The selection of a suitable substrate material such as a II–VI compound, for example, providing light energy propagation velocity matching the electrical microwave signal propagation velocity (such substrate in both its diffused and undiffused state will have substantially and essentially the same propagation velocity for the same optical signal energy).
3. Correction of differences between the two propagation velocities to provide closely matched propagation velocities by changing the dimensions of the microwave strip transmission lines to bring about the desired substantially same propagation velocities.

Both the modulators described in FIGS. 1 and 2 are inherently of the phase modulator type; however, they may be fabricated as amplitude modulators by utilizing external light polarizers in a manner which will be readily apparent to those knowledgeable and skilled in the pertinent arts.

Figure 3:
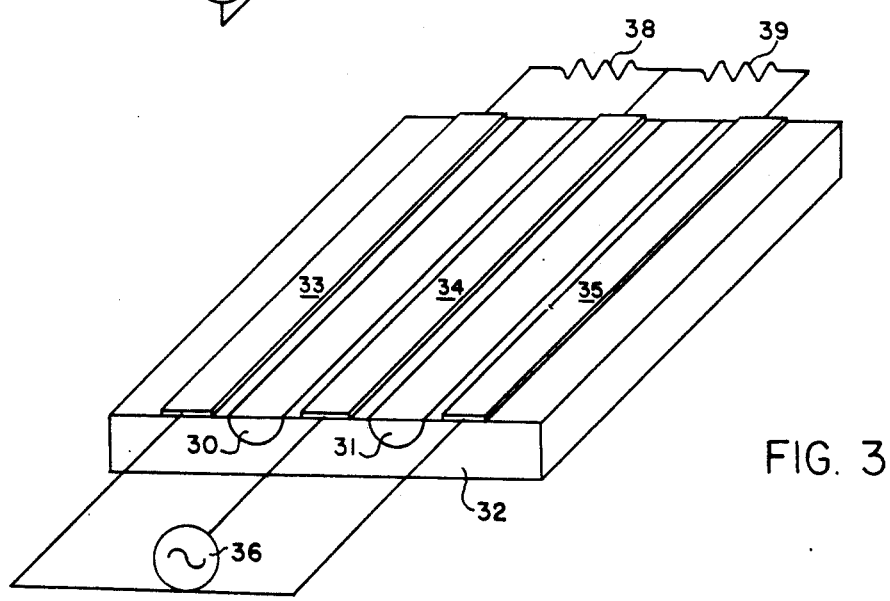
FIG. 3 is a greatly enlarged representation of an embodiment of the present invention in the form of a switch as contrasted to the modulation functions of the embodiments illustrated in FIGS. 1 and 2.

FIG. 3 illustrates an embodiment of the present invention which is operative as a switch rather than purely as a modulator. In FIG. 3, two channel optical waveguides 30 and 31 are fabricated co-linearly by a suitable diffusion maintaining a small separation in the substrate 32. Electrically conductive elements 33, 34, and 35 form strip transmission lines which are co-extensive and co-directional with the two channel optical waveguides 30 and 31. The strip transmission lines 33, 34, and 35 are connected to a suitable source of electrical drive signals 36 and also to appropriate electrical load means 38, 39 to complete electrical circuits for the aforementioned electrical drive signals.

In operation the drive signals which are impressed on the strip transmission lines 33, 34, and 35 are chosen in accordance with the concept and teaching of the present invention as to provide a propagation velocity which is substantially equal to the propagation velocity of the light propagated in either the channel optical 30 or the channel optical waveguide 31 and the electrical load means 38 and 39 are chosen to provide negligible reflected electrical waves.

The resulting interaction of the electrical drive signals propagating along the strip transmission lines 33, 34, and 35 cause the optical energy propagating along one of the channel optical waveguides such as 30, for example, to be transferred over into the other channel optical waveguide 31. It will be apparent, of course, to those knowledgeable and skilled in the art, that the converse operation can be readily arranged if desired to transfer light energy propagating along the channel optical waveguide 31 into its co-extensive and adjacent channel optical waveguide 30.

It may readily be appreciated therefore by those knowledgeable and skilled in the pertinent arts, that the concept and teaching of the present invention provides an optical waveguide modulator and switch in which the length of the structure is not limited as in many functionally similar prior art devices with the resultant advantage of a decrease in required magnitude of electrical drive signal employed to modulate and transfer optical energy. Consequently a much greater electrical drive signal bandwidth is made possible.

Moreover, the present invention may be practiced and fabricated by convenient and known techniques of diffusion, masking, etc. which are highly desirable in the practice of the electro optic arts and also afford easy change of dimensions of the operative elements of the modulator switch to conform to the teachings of the present invention.

Obviously many modifications and variations of the present invention are possible in the light of the above teachings. It is therefore to be understood that within the scope of the appended claims the invention may be practiced otherwise than as specifically described.

What is claimed is:

1. An optical waveguide modulator and switch comprising:
   an optical waveguide defining a path for the propagation of optical energy;
   a source of microwave energy;
   at least one strip transmission line disposed in co-directional proximity relative to said optical waveguide and connected to said source of microwave energy, said strip transmission line having dimensions and dielectric constants for producing a propagation velocity of the flow of said microwave energy substantially equal to the propagation velocity of said optical energy in said optical waveguide, causing a resultant traveling wave interaction therebetween; and
   a microwave load means connected through electrical conductors to said strip transmission line for completing a closed electrical circuit with said source of microwave energy to absorb substantially all said microwave energy without any reflected wave energy.

2. An optical waveguide modulator as claimed in claim 1 wherein said optical waveguide comprises a channel waveguide of material diffused into a II–VI compound substrate.

3. An optical waveguide modulator as claimed in claim 1 wherein said strip transmission line overlays said optical waveguide with an insulating layer therebetween.

4. An optical waveguide modulator as claimed in claim 1 including first and second strip transmission lines disposed on opposite sides of said optical waveguide.

5. An optical waveguide modulator as claimed in claim 4 wherein said first and second strip transmission lines and said optical waveguide are supported by a common substrate material.

6. An optical waveguide modulator as claimed in claim 4 wherein said first and second strip transmission lines are connected to said source of microwave energy at one end and connected to said microwave load means at the opposite ends.

7. An optical waveguide modulator and switch comprising:

first and second optical waveguides defining co-directional, co-extensive paths for the propagation of optical energy;

a source of microwave energy;

a first strip electrode disposed between said optical waveguides in co-directional, co-extensive relation thereto;

second and third strip electrodes on opposite sides of said optical waveguides in co-directional, co-extensive relation thereto;

means connecting said first strip electrode to one output of said microwave source and said second and third strip electrodes to the other output of said source of microwave energy to form strip transmission lines, said strip electrodes having dimensions and dielectric constants for producing a propagation velocity of said microwave energy substantially equal to the propagation velocity of said optical energy in said optical waveguides; and microwave load means connected to said strip transmission lines for completing electrical circuits with said source of microwave energy.

* * * * *